United States Patent [19]
Emmons, Jr. et al.

[11] Patent Number: 5,197,074
[45] Date of Patent: Mar. 23, 1993

[54] MULTI-FUNCTION INTRA-RESONATOR LOSS MODULATOR AND METHOD OF OPERATING SAME

[75] Inventors: Donald R. Emmons, Jr.; Curtis J. Gouverneur; Terri J. Irland, all of Beaverton, Oreg.

[73] Assignee: Electro Scientific Industries, Inc., Portland, Oreg.

[21] Appl. No.: 814,420

[22] Filed: Dec. 26, 1991

[51] Int. Cl.[5] ............................................. H01S 3/10
[52] U.S. Cl. ....................................... 372/26; 372/10; 372/12; 372/13; 372/31; 372/38; 372/92
[58] Field of Search ....................... 372/10, 13, 12, 26, 372/31, 92, 99, 38

[56] References Cited

U.S. PATENT DOCUMENTS

| | | | |
|---|---|---|---|
| 3,656,068 | 4/1972 | Runge | 372/26 X |
| 3,703,687 | 11/1972 | Maydan | 331/94.5 |
| 3,774,120 | 11/1973 | Ross | 372/31 X |
| 3,858,056 | 12/1974 | Melamed et al. | 372/31 X |
| 3,962,558 | 6/1976 | Kocher et al. | 219/121 |
| 4,176,327 | 11/1979 | Wayne et al. | 331/94.5 M |
| 4,314,210 | 2/1982 | Everett | 372/18 |
| 4,498,179 | 2/1985 | Wayne et al. | 372/27 |
| 4,528,668 | 7/1985 | Wayne et al. | 372/26 |
| 4,630,275 | 12/1986 | Rapoport | 372/26 |
| 4,752,931 | 6/1988 | Dutcher et al. | 372/10 |
| 4,930,901 | 6/1990 | Johnson et al. | 372/26 |
| 4,955,725 | 9/1990 | Johnson et al. | 372/26 X |
| 5,001,717 | 3/1991 | Mayer et al. | 372/26 X |
| 5,063,568 | 11/1991 | Chiba et al. | 372/26 X |
| 5,081,635 | 1/1992 | Wakabayashi et al. | 372/31 X |

FOREIGN PATENT DOCUMENTS 1545933  5/1979  United Kingdom ............ 372/26 X

*Primary Examiner*—Brian Healy
*Attorney, Agent, or Firm*—Stoel Rives Boley Jones & Grey

[57] ABSTRACT

A laser system is provided with a multi-function intra-resonator loss modulator to generate laser output having selectable amplitude within a relatively wide amplitude range and selectable duration within a relatively wide duration range while preserving mode quality, waist position, and divergence of the laser output.

20 Claims, 2 Drawing Sheets

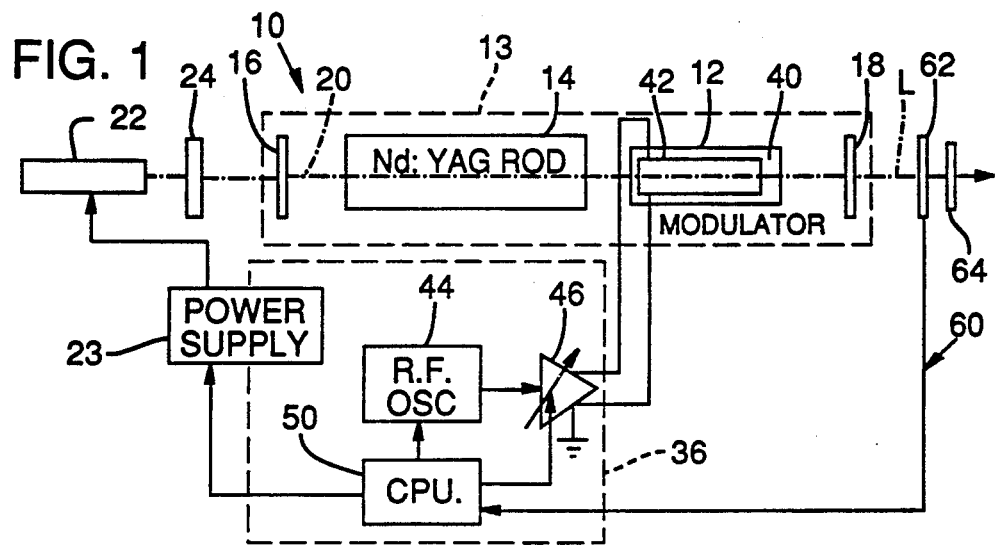
FIG. 1
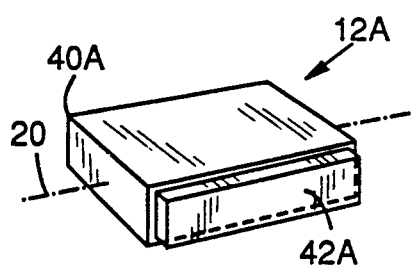
FIG. 2A
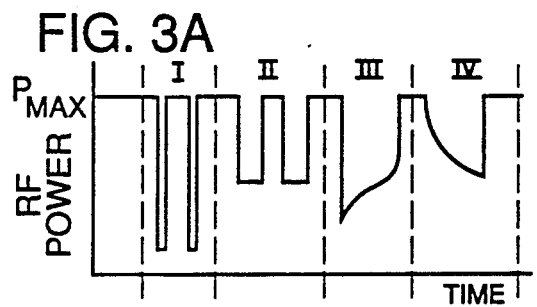
FIG. 3A
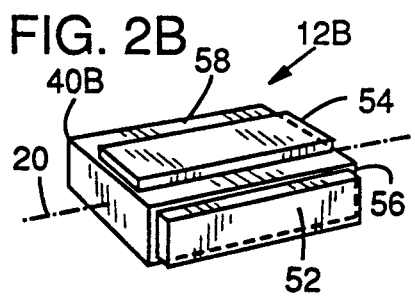
FIG. 2B
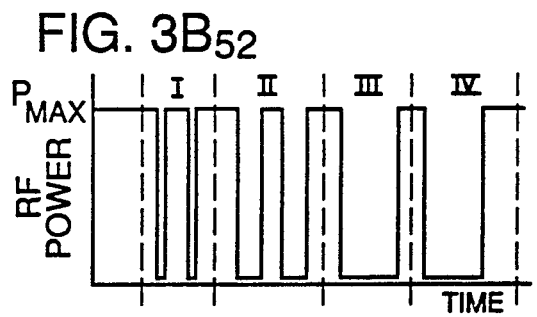
FIG. 3B$_{52}$
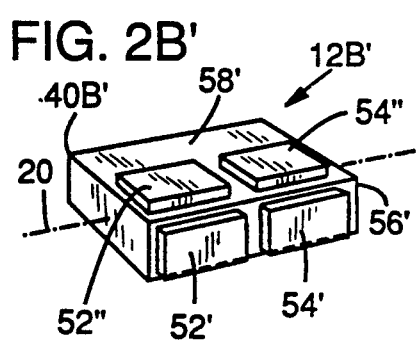
FIG. 2B'
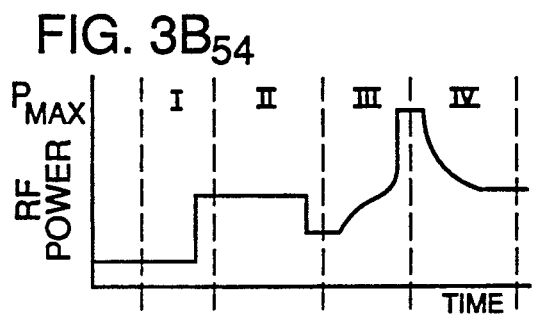
FIG. 3B$_{54}$

MULTI-FUNCTION INTRA-RESONATOR LOSS MODULATOR AND METHOD OF OPERATING SAME

TECHNICAL FIELD

The present invention relates to controlling output of laser systems and, in particular, to a method for employing a variable intra-resonator loss apparatus that permits extensive and convenient tailoring of a laser beam without significantly affecting its spatial quality or position accuracy.

BACKGROUND OF THE INVENTION

Continuing advances in laser technology have greatly increased the number of industrial and scientific applications for which lasers have been employed. Conventional laser systems may be employed, for example, to perform micromachining operations such as trimming thin-film resistors or repairing defective integrated circuits. Target structures such as these often have minimum critical dimensions of between 5 and 75 microns. Such micromachining operations generally employ and often require laser systems having output position accuracy and shape tolerances of about 1.0 micron on the target structure.

Certain laser systems have been designed to provide limited, but useful amplitude control of laser output. For example, U.K. Patent No. GB 1,545,933 of LASAG AG describes a pulsed-current pumped laser system that generates high amplitude laser output to provide "clean" incremental ablation to produce a hole of a desired depth in a target substrate by maintaining vaporization of molten substrate material during hole formation. The laser system employs a dedicated, non-versatile driving circuit, a resonator having an operation-specific length, and a Q-switch to provide limited, preselected, amplitude control of laser output. The system also employs a light switch to rapidly cut off the trailing edges of the output generated by the selectively long laser resonator.

U.S. Pat. No. 3,962,558 of Kocher et al. describes a pulsed-current pumped laser system that employs a succession of high amplitude laser output to create holes in watch jewels. The system increases the amplitude of the initial spikes of the output to create an absorbing state in transparent or reflective materials.

These laser systems are designed and constructed, however, to produce laser output having very narrow non-variable ranges of amplitude and duration for highly specific operations. Furthermore, the tolerances required by these applications necessitate meticulous and dedicated output-specific alignment of all the laser system optical components.

Increased laser utility has, however, created a demand for more versatile laser systems to perform a variety of operations employing vastly different extremes in output amplitude on target structures having even smaller critical dimensions. For example, U.S. Pat. No. 4,930,901 of Johnson et al. preferably employs a continuously current pumped laser system that, in conjunction with a Q-switch, generates high amplitude laser output suitable for severing electrical leads from a lead frame. The system is preferably driven by a programmable, high speed switching power supply capable of changing the current at a rate of 0.125 amp/$\mu$sec. The switch timing of the power supply and the Q-switch is coordinated to provide output amplitude shaping control of both the leading and the trailing edges, as well as control of output duration and amplitude level. The versatile output amplitude shaping control permits the same continuously pumped laser system to simulate low amplitude pulse-current pumped laser output of selectable amplitude shape and duration for bonding leads to a printed circuit. Thus, the laser system can perform both bonding and severing processes.

One disadvantage of such a laser system is that whenever the laser system pumping energy or pumping pulse length is altered, the thermal loading of the laser rod is affected. The focal length of the laser rod shortens or lengthens whenever a higher or lower pumping energy is generated, respectively, or whenever the pulse length is increased or decreased, respectively. Such changes in the focal length adversely affect the spatial mode content, waist position, and divergence of the laser output.

A second disadvantage is that high speed changes in pumping extremes will wear out a typically expensive light source of such a laser system in a relatively short period of time. In addition, the pulse repetition rate of such a laser system is limited by the rate at which the current can be ramped between the below threshold level and the pumping level required to generate the desired output amplitude level.

SUMMARY OF THE INVENTION

An object of the present invention is, therefore, to provide a laser system and method capable of generating a laser output having preserved mode quality, waist position, and output divergence; a selectable amplitude within a relatively wide amplitude range; and a selectable duration within a relatively wide duration range.

Certain laser systems employ devices to modulate polarized light beams in a variety of applications such as laser Q-switching, external modulation, and beam deflection. The following summary is presented herein only by way of example with reference to a modulator, and more specifically an acousto-optic modulator, for a laser system.

A conventional laser modulator includes an optically transparent acousto-optic medium through which incident light propagates along an optical path. An acoustic wave transducer is coupled to the medium, and in response to radio frequency (RF) signals, generates acoustic waves that propagate through the medium in a direction transverse to the optical path. The acoustic waves modulate the index of refraction of the medium and form a type of diffraction grating that diffracts or deflects the incident light.

The modulator may be positioned, for example, in a laser resonator to control laser oscillation and thereby modulate the intensity of radiation or energy buildup within the laser resonator and the energy build up in the amplifying medium. By effectively blocking one of the end mirrors in a laser resonator, such a conventional intraresonator modulator acts as an all or nothing laser ON/OFF switch or Q-switch, thereby greatly increasing resonator loss and preventing laser oscillation. Thus, when it is in a non-transmissive or closed (OFF) state, the modulator prevents output light emissions from occurring but allows continued storage of pumping energy in an amplifying medium within the laser resonator. When it is in a transmissive or open (ON) state, the modulator reduces resonator losses and allows the extraction of the stored energy in the form of a laser pulse of relatively high peak power.

The present invention employs a modulator to variably and selectively adjust the loss within the laser resonator, thereby controlling the initiation, amplitude, and duration of the laser output. In a preferred embodiment, the modulator is coupled to two acoustic wave transducers. One transducer is used as an ON/OFF switch and is employed to operate the modulator as a Q-switch. The transducer receives an RF signal of sufficient amplitude or power to generate acoustic waves in the optical medium to prevent laser oscillation whenever no laser output is desired. The RF signal applied to this transducer is substantially eliminated to initiate full laser oscillation.

On the other hand, the power level of the RF signal received by the second transducer is selected to generate acoustic waves in the optical medium that will adjust the level of laser oscillation within the laser resonator and thereby control the amplitude over an extended range throughout the curation or the laser output.

Unlike conventional methods for controlling the amplitude or power of laser output, the method and apparatus of the present invention do not alter the thermal loading or focal length of the laser rod. The present invention permits, therefore, usable laser output having a relatively wide selectable amplitude range. The mode quality, waist position, and divergence of the laser output in accordance with the present invention are not subject to distortion normally caused by changes in pumping energy. Such fine tuning of laser output amplitude in accordance with the present invention permits a single laser system to provide high precision micromachining on a variety of substrate materials requiring a diverse range of amplitude.

A person skilled in the art will appreciate that the invention may be practiced with, but not limited to, a single transducer and a multiple function control device; two transducers sharing such a control device; two transducers having independent control devices; or two or more discrete optical media, each having one or more transducers receiving signals from a single control device or multiple control devices. It will also be appreciated that electro-optic modulators and other well-known equivalent variable modulating devices can be employed in accordance with the present invention.

Additional objects and advantages of the present invention will be apparent from the following detailed description of preferred embodiments thereof, which proceeds with reference, to the accompanying drawings.

BRIEF DESCRIPTION OF THE DRAWINGS

FIG. 1 is a schematic diagram of a preferred embodiment of a laser system incorporating a modulator employed by the invention.

FIGS. 2A, 2B nd 2B are schematic isometric views of acousto-optic modulators having one to four transducers employed in accordance with preferred embodiments of the present invention.

FIGS. 3A, $3B_{52}$, and $3B_{54}$ graphs showing examples of a series of diverse power profiles of RF signals applied to modulators to produce laser output of selectable amplitude in accordance with the present invention.

DETAILED DESCRIPTION OF PREFERRED EMBODIMENTS

Figure 4:
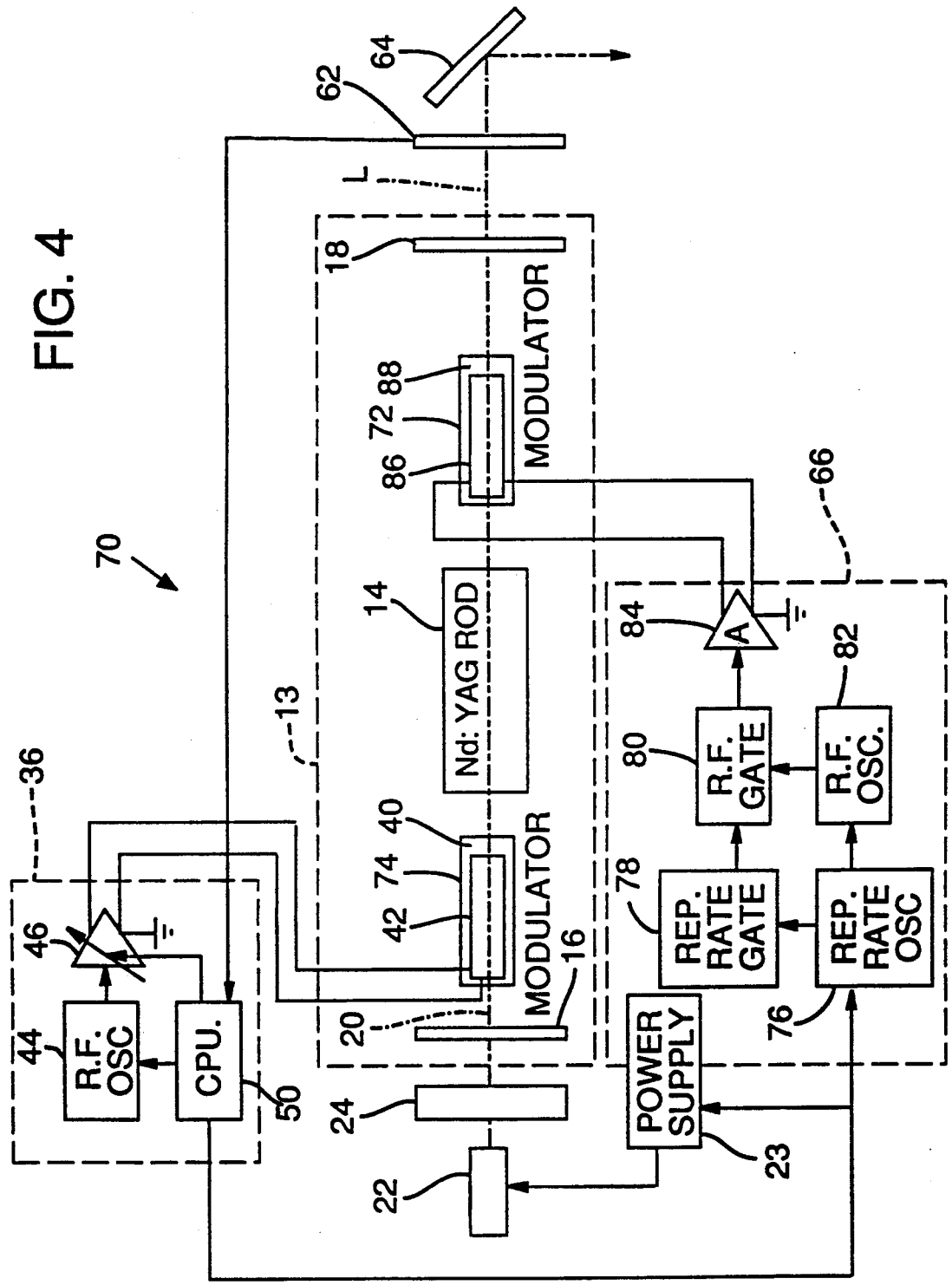
FIG. 4 is a schematic diagram of an alternative embodiment of a laser system of the present invention employing two distinct modulators having distinct control units linked to a common computer processing unit.

FIG. 1 is a block diagram of a laser system 10 incorporating a modulator 12 of the present invention positioned within a laser resonator 13 that includes a solid state rod 14, preferably of the Nd:YAG or Nd:YLF type, located between a pair of mirrors 16 and 18 along an optic axis 20. Laser system 10 preferably includes a light source 22 located on the opposite side of mirror 16 from laser rod 14 and aligned along optic axis 20. A lens system 24 of conventional design interposed between mirror 16 and light source 22 and positioned along optic axis 20 collimates, focuses, or corrects the output light emitted by light source 22. Skilled persons will appreciate that laser system 10 may be pumped in a variety of ways. For example, light source 22 may include a laser diode or arc lamp, may receive electrical current from either a continuous or pulsed power supply 23, and may be positioned perpendicular to instead of along optic axis 20 to allow pumping from the side. In the case of pumping from the side, mirror 16 need only reflect light emitted by laser rod 14.

Mirror 16 transmits most of the light emitted by light source 22 and reflects most of the light emitted by laser rod 14, and mirror 18 transmits part of the light emitted by laser rod 14. Modulator 12, interposed along the optic axis 20 between mirror 18 and laser rod 14, modulates resonator loss, and hence the intensity of laser output L as determined by laser output control unit 36. Modulator 12 preferably employs an acousto-optic medium 40, including but not limited to fused silica, SF-10, or SF-57, that is bonded to an acoustic wave transducer 42 that receives an RF signal from control unit 36. Skilled persons will appreciate that modulator 12 may alternatively employ electro-optic components, such as a Pockel's cell, or other equivalents and may be alternatively positioned between mirror 16 and laser rod 14.

Control unit 36 preferably includes an RF signal oscillator 44 that produces a continuous-wave signal of a selectable or predetermined frequency typically in the 20-40 MHz range. Variable gain amplifier 46 amplifies the RF signal to a power level generated in response to a signal provided from central processing unit (CPU) 50, and delivers the variably amplified RF signal to transducer 42. Thus, several parameters of the RF signal reaching transducer 42 are selectively variable.

FIGS. 2A, 2B, and 2B' are schematic isometric views of acousto-optic modulators 12A, 12B, and 12B', respectively, that are representative embodiments of modulator 12 employed in laser system 10 in accordance with the present invention. With reference to FIG. 2A, modulator 12A includes an acoustic wave transducer 42A bonded to a preferably stress-resistant block of acousto-optic medium 40A. With reference to FIG. 2B, transducers 52 and 54 are preferably positioned parallel to optic axis 20 and parallel to each other on respective different surfaces 56 and 58 of acousto-optic medium 40B. With reference to FIG. 2B', transducers 52' and 54' are preferably positioned parallel to optic axis 20 and coplanar to each other on surface 56' of acousto-optic medium 40B'.

The operation of modulators 12A, 12B, and 12B' is described below with reference to modulator 12, acousto-optic medium 40, and transducer 42 shown in FIG. 1. Whenever it receives an RF signal from the output of amplifier 46, transducer 42 launches an acoustic wave that interacts with acousto-optic medium 40. The acoustic wave propagates in a direction typically perpendicular to optic axis 20 and causes a change in the refractive index of acousto-optic medium 40. The power level of the acoustic wave propagating within the acousto-optic medium 40 affects the loss in resonator 13.

Whenever an acoustic wave of sufficient power to prevent feedback propagates through acousto-optic medium 40, the energy generated by light source 22 is prevented from oscillating between mirrors 16 and 18 and therefore builds within laser rod 14. Whenever the acoustic wave propagating through acousto-optic medium 40 is eliminated, the energy accumulating within the laser rod 14 propagates between mirrors 16 and 18 and is released in the form of laser output L, propagating along the optic axis 20 of the laser system 10.

The RF power level ($P_{RF}$) delivered to transducer 42 is variable over a wide range and preferably from 0 to 10 watts. The limit of the upper power range is largely determined by the gain limit of amplifier 46 and the stress resistance of acousto-optic medium 40. Preferably, the maximum power ($P_{max}$) of the RF signal delivered to transducer 42 is the power required to generate a loss within resonator 13 sufficient to prevent laser output under given pumping conditions ($Q_P$). Such a $P_{max}$ permits a small decrease in RF power level applied to transducer 42 to enable laser output.

FIG. 3A presents a graph exemplifying a series of RF power versus time profiles I-IV of the level of an RF signal applied to acoustic wave transducer 42A of modulator 12A from variable gain amplifier 46. $P_{max}$ may be, for example, be 5 watts. It will be appreciated, however, that a continuous RF signal delivered to transducer 42A at a selectable constant power level between $P_{max}$ and 0 watts may be employed to produce a continuous laser output having a desired intensity or amplitude ($I_L$) for a given pumping level.

With reference to FIG. 3A, Profile I illustrates control of the RF power supplied to acoustic transducer 42A to generate high energy laser output of very short duration for use in hole drilling. Such laser output may, for example, entail an RF power drop of about 4 watts for 0.5 μsec and cause a laser output of 10,000 watts for 0.1 μsec.

Profile II illustrates RF level control employing a higher power and longer duration suitable, for producing laser output of lower intensity (400 watts) for bonding leads to a substrate by simulating the long pulse width (1-10 msec) of a flashlamp-pumped laser.

Profile III illustrates RF level control suitable for producing a laser output having an initial spike followed by a tail of decreasing intensity that may preferably be employed for bonding highly reflective leads to substrates. These pulses may entail an initial drop in RF power of 3 watts followed by a gradual increase over a period of 10 msec to result in a laser output having a 600 watt spike followed by a 100 watt trailing edge.

Profile IV illustrates RF level control suitable for producing a laser output having a gradually increasing intensity for bonding non-reflective leads to substrates to increase bond strength. These pulses typically entail a gradual drop in RF power from 5 to 2.5 watts over a 10 msec period and cause a laser output that gradually increases from 0 to 400 watts.

It will be noted that Profiles I-IV are hypothetical examples used only to demonstrate the versatility of laser output control of the present invention. In practice, however, the relationships between $P_{RF}$ and $I_L$ is typically nonlinear. It will also be appreciated that the actual mathematical relationships among $Q_P$, $P_{RF}$, and $I_L$ may differ for the chosen type of acousto-optic medium 40.

Preferred embodiments employ, therefore, a laser output feedback system 60 (FIG. 1) that is in communication with CPU 50. Feedback system 60 permits rapid adjustment of output L to selectable or preset intensities. Feedback system 60 may, for example, include an optically transparent light sensor 62 that produces a voltage signal proportional to the intensity of output L, and perhaps compares it to an output level selected by an operator. Upon receiving this signal, CPU 50 adjusts the voltage applied to amplifier 46, hence adjusting the RF power level applied to transducer 42, and therefore adjusting the intensity of laser output L. One skilled in the art will recognize that more sophisticated feedback systems may be employed.

It will be appreciated that in accordance with the present invention, even substantial selected changes in the intensities, during or between laser outputs L, do not substantially affect the quality of outputs L. Thus, the mode quality, waist position, and divergence of the laser outputs L are preserved to interact with external optical components 64 whose positioning is dependent on the resonator length or the pumping energy supplied to laser system 10.

With reference to the alternate embodiments of modulator 12 shown in FIGS. 2B and 2B', the operation of transducers 52, 52', and 52" is described below with reference to transducer 52. Transducer 52 is primarily employed as an ON/OFF switch. Transducer 52 receives an RF signal having at least sufficient power level to generate acoustic waves in the acousto-optic medium 40B that will prevent laser oscillation whenever no laser output is desired. Preferably, the $P_{max}$ of the RF signal delivered to transducer 52 equals the minimum power required to generate a loss within resonator 13 sufficient to prevent laser output under given pumping conditions. Thus, only a small decrease in the level of the RF power delivered to transducer 52 will permit laser oscillation to generate some laser output. The RF signal delivered to transducer 52 is interrupted to permit uninhibited laser operation in a typical Q-switch type manner, or the RF signal may be reduced to a selected magnitude to limit the amplitude or intensity range of the forthcoming laser output. The primary function of transducer 52 is, however, to initiate and control the duration of laser outputs L.

FIG. $3B_{52}$ presents a graph exemplifying a series of RF power versus time Profiles I-IV of the level of an RF signal applied to acoustic wave transducer 52 from a variable gain amplifier similar to variable gain amplifier 46 described in connection with FIG. 1.

With reference to FIGS. 2B and 2B', the operation of transducers 54, 54' and 54" is described with reference to transducer 54. The power level of the RF signal received by transducer 54 is selectively chosen to generate acoustic waves in the acousto-optic medium that will adjust the level of laser oscillation within the laser resonator whenever the RF signal to transducer 52 is interrupted and thereby control the amplitude of the laser output over an extended amplitude range throughout the duration of the output. The RF signal delivered to transducer 54 may be continuous or may be switched on and off alternately with the RF signal delivered to transducer 52.

FIG. $3B_{54}$ presents a graph exemplifying a series of RF power versus time Profiles I-IV of the level of an RF signal delivered to acoustic wave transducer 54 from a variable gain amplifier similar to variable gain amplifier 46 shown in connection with FIG. 1.

The power level of the RF signals received by transducer 52 may be determined by a control unit similar to control unit 36. The power level of the RF signals received by transducer 54 may be determined by a control unit similar to control unit 66, described below in connection with FIG. 4. The combined interaction of transducers 52 and 54 on acousto-optic medium 56 are thus employed to simulate, for example, the same types of power control pulses exemplified in FIGS. 3A I–IV for generating a variety of laser outputs. Using distinct transducers 52 and 54 as described above may increase the dynamic range of laser output attenuation over the embodiment described with respect to FIG. 2A. A second set of transducers 52″ and 54″, shown in FIG. 2B′, may be employed to increase the response time of modulator 12B′, allowing even finer control of the trailing edge of output L.

FIG. 4 shows an alternate embodiment of the present invention incorporating distinct modulators 72 and 74. The features of laser system 70 that correspond to features in laser system 10 are shown in FIG. 4 with identical reference numerals. With reference to FIG. 4, modulator 72 functions very much like a Q-switch, largely determining the initiation and duration of laser outputs by preventing or allowing oscillation to occur in resonator 13. Modulator 72 is preferably positioned along optical path 20 within resonator 13 and on the opposite side of laser rod 14 from modulator 74.

Control unit 66 includes a repetition rate oscillator 76 and a repetition rate gate 78 that cooperate to provide a series of gating pulses to the gate input of an RF signal gate 80. Signal gate 80 receives at its input a continuous-wave signal from RF signal oscillator 82 and, in response to the pulses delivered by repetition rate gate 78, develops a stream of RF pulses of a frequency determined by the frequency of signal oscillator 82 for a duration determined by the pulse width of the pulses. The delivery of pulses to signal gate 80 inhibits the production of RF pulses at the output of signal gate 80.

An amplifier 84 amplifies the stream of RF pulses and delivers them to acoustic wave transducer 86, which forms a part of modulator 72. Whenever it receives an RF pulse from the output of amplifier 84, transducer 86 launches an acoustic wave that interacts with an acousto-optic medium 88 to prevent oscillation from occurring within resonator 13 and allows energy from light source 22 to accumulate within laser rod 14. Whenever transducer 86 does not receive an RF pulse from the output of amplifier 84, no acoustic wave propagates through acousto-optic medium 88, and the stored energy within rod 14 is permitted to oscillate between mirrors 16 and 18 and is released in the form of a laser output L propagating along optic axis 20. The RF pulses delivered to transducer 86 of modulator 72 may resemble, for example, the RF pulses illustrated in FIG. $3B_{52}$.

Modulator 74 includes acousto-optic medium 40 preferably coupled to a single acoustic wave transducer 42 that receives RF signals of selectable strength from control unit 36. The RF pulses delivered to transducer 42 of modulator 74 may resemble, for example, the RF pulses illustrated in $3B_{54}$. The use of distinct modulators 72 and 74 permits an increased dynamic range of attenuation for laser output L and may decrease the overall stress applied to the acousto-optic media of the modulators. Accordingly, the acousto-optic media will be less likely to develop stress fractures.

It also will be appreciated that the relative positioning of modulators 72 and 74 may be changed or even reversed, but still fall within the scope of the present invention. For example, modulators 72 and 74 may be positioned on the same side of rod 14 and in either order along optic axis 20.

It will be obvious to those having skill in the art that various changes may be made in the details of the above-described embodiments of the present invention without departing from the underlying principles thereof. The scope of the present invention should be determined, therefore, only by the following claims.

We claim:

1. A laser system for generating laser output for impingement upon a target, comprising:

light-amplifying and optical media positioned within a laser resonator;

pumping means for pumping the light-amplifying medium to generate energy build-up within the light-amplifying medium;

modulator means including a transducer and the optical medium interacting with the light-amplifying medium to provide a first state in which no laser output takes place and to provide a second state in which laser output takes place such that it has selectable amplitude within a relatively wide amplitude range and has selectable duration within a relatively wide duration range; and modulator control means operatively associated with the modulator means for providing a first signal characterized by a predetermined parameter to switch the modulator means to the first state and thereby prevent laser output and for changing the first signal to a second signal characterized by a selectable parameter to switch the modulator means to the second state so that the modulator means produces a laser output having preserved mode quality, waist position, and divergence, and an amplitude that is responsive to the parameter of the second signal.

2. The laser system of claim 1 in which the transducer is a first transducer adapted for receiving the first and second signals such that the second signal has a selectable duration determining the duration of laser output and the parameter characterizing the second signal limits the amplitude of laser output, the laser system further comprising:

a second transducer for receiving a third signal characterized by a selectable parameter provided from the modulator control means such that the parameter characterizing the third signal substantially determines the amplitude of laser output within the limit established by the second signal.

3. The laser system of claim 2 in which the first transducer and the second transducer are coupled to the same optical medium.

4. The laser system of claim 2 in which the first transducer is coupled to the optical medium to form a first modulator and the second transducer is coupled to a second optical medium to form a second modulator such that the modulator control means coordinates the operation of the first and second modulators so that the second modulator substantially determines the amplitude of laser output and the first modulator functions like a Q-switch to initiate laser output and determine its duration.

5. The laser system of claim 4 in which the light amplifying medium is positioned between the first and second modulators along an optic axis.

6. The laser system of claim 1 in which the modulator means comprises an acousto-optic device.

7. The laser system of claim 1 in which the parameter is RF power and the second signal has less RF power than that of the first signal.

8. The laser system of claim 1 further comprising a compact, diode-pumped, solid-state laser.

9. The laser system of claim 1 in which the modulator means comprises a Pockels cell.

10. The laser system of claim 2 in which the modulator means comprises an acousto-optic device, the parameter is RF power, and each of the second and third signals has less RF power than that of the first signal.

11. A method for operating a laser having a light-amplifying medium and an optical modulator positioned within a laser resonator to generate laser output having selectable amplitude and duration comprising:
    pumping the light-amplifying medium to generate energy build-up within the medium;
    providing a first signal characterized by a predetermined parameter to a transducer of the modulator to switch the modulator to a first state and thereby prevent laser output;
    changing the first signal to a second signal characterized by a selectable parameter to switch the modulator to a second state to generate laser output having good mode quality, waist position, and divergence; and
    selecting the parameter characterizing the second signal substantially to determine the amplitude of laser output from a relatively wide amplitude range such that the mode quality, waist position, and divergence of the laser output is substantially preserved independent of the output amplitude selected.

12. The method of claim 11 in which the second signal has a duration substantially determining the duration of laser output and the parameter characterizing the second signal limits the amplitude of laser output, the method further comprising:
    providing a third signal characterized by a selectable parameter to a second transducer such that the parameter characterizing the third signal substantially determines the amplitude of laser output.

13. The method of claim 12 in which the transducer and the second transducer are coupled to the same optical medium.

14. The method of claim 12 in which the modulator is a first modulator including the first transducer coupled to the optical medium and the second transducer is coupled to a second optical medium to form a second modulator that substantially determines the amplitude of laser output, and in which the first modulator functions like a Q-switch to initiate laser output and determine its duration.

15. The method of claim 14 in which the light amplifying medium is positioned between the first and second modulators along an optic axis.

16. The method of claim 11 in which the first modulator comprises an acousto-optic device, the parameter is RF power, and the second and third signals have less RF power than that of the first signal.

17. A modulation system for tailoring amplitude of output exiting a laser resonator, comprising:
    a modulator including a transducer coupled to an optical medium; and
    modulator control means operatively associated with the modulator for selectively controlling optical feedback within the resonator, thereby selectively determining duration of the output and selectively shaping the amplitude of the output throughout its duration while preserving mode quality, waist position, and divergence of the output independent of the amplitude selected from a relatively wide amplitude range.

18. A method of selectively modulating optical feedback within a laser resonator to generate laser output having a selected amplitude profile, comprising:
    providing a first signal characterized by a predetermined parameter to switch an intra-resonator modulator to a first state that prevents resonator feedback;
    changing the first signal to a second signal characterized by a selectable parameter to switch the modulator into a second state that determines the amount of resonator feedback occurring within the resonator, the parameter characterizing the second signal thereby substantially determining amplitude of the laser output from a relatively wide amplitude range.

19. The method of claim 18 in which the modulator comprises an acoustic wave transducer adapted for receiving the signals; the parameter is RF power; the RF power of the first signal is greater than that of the second signal; and the laser output has preserved mode quality, waist position, and divergence.

20. The method of claim 19 in which the second signal has a duration substantially determining the duration of laser output and the parameter characterizing the second signal limits the amplitude of laser output, the method further comprising:
    proving a third signal characterized by a selectable parameter to a second transducer such that the parameter characterizing the third signal substantially determines the amplitude of laser output within the limit established by the second signal.

* * * * *